United States Patent [19]

Sellar et al.

[11] Patent Number: 4,852,740

[45] Date of Patent: Aug. 1, 1989

[54] HOLDER FOR FLAT OBJECTS SUCH AS COMPUTER DISKS

[75] Inventors: James R. Sellar, Pittsford; James E. Reisdorf, Rochester; Mark F. Lappies, Marion; Mark S. Valle, Spencerport, all of N.Y.

[73] Assignee: Information Packaging Corp., Macedon, N.Y.

[21] Appl. No.: 167,065

[22] Filed: Mar. 11, 1988

[51] Int. Cl.[4] .............................................. B65D 85/30
[52] U.S. Cl. .................................. 206/444; 206/232; 206/309; 229/72
[58] Field of Search ................ 206/232, 309, 311, 312, 206/444, 473, 45, 44.11, 425; 150/147; 40/120, 124.2, 124.1; 229/72, 1.5 R

[56] References Cited

U.S. PATENT DOCUMENTS

| | | | |
|---|---|---|---|
| 768,670 | 8/1904 | Martin | 229/72 |
| 1,397,477 | 11/1921 | Wokoun . | |
| 1,683,479 | 9/1928 | Nystrom . | |
| 2,296,272 | 9/1942 | Dersherbinin . | |
| 2,354,820 | 8/1944 | McCarty | 229/72 |
| 3,399,823 | 9/1968 | Johnson | 229/72 |
| 3,522,908 | 8/1970 | Carrigan | 229/72 |
| 3,528,602 | 9/1970 | Ritchie | 229/72 |
| 3,717,279 | 2/1973 | Perry . | |
| 3,735,516 | 5/1973 | Wenstrom . | |
| 3,797,146 | 3/1974 | Holes . | |
| 3,858,791 | 1/1975 | Gendron | 229/72 |
| 4,055,008 | 10/1977 | Bell . | |
| 4,114,799 | 9/1978 | Brown | 229/72 |
| 4,190,161 | 2/1980 | Gendron | 229/72 |
| 4,473,153 | 9/1984 | Colangelo . | |
| 4,508,366 | 4/1985 | Brindle . | |
| 4,589,544 | 5/1986 | Schweinsberg | 206/45 |

FOREIGN PATENT DOCUMENTS 168778 3/1958 Sweden .

OTHER PUBLICATIONS

IBM Tech. Discl. Bull., Jun. 19, 1986, vol. 29, 1, 6/19/86, p. 19, "Diskette Jacket".

Primary Examiner—David T. Fidei
Attorney, Agent, or Firm—M. Lukacher

[57] ABSTRACT

Holders for flat objects such as computer disks which can provide pages of a book which carries such objects, instruction for their use and etc. Each page is made of a single sheet of foldable material, preferably spunbonded olefin (such material being available from DuPont under their tradename "Tyvek"). The sheets are cut into the shape of rectangular center panels with bottom and side flaps extended therefrom; the side flaps extending from opposite side edges of the center panel and being off-set from each other. Since a single sheet is used it may be printed with visible indicia (e.g., the name of the manufacturer of and the computer program on the disks), prior to cutting, by conventional printing techniques in one pass through the press. The cut sheets (blanks) can then be manipulated in envelope manufacturing equipment which scores, applies adhesive lines and folds the flaps to provide a plurality of partially overlapping pockets, disposed one above the other.

16 Claims, 4 Drawing Sheets

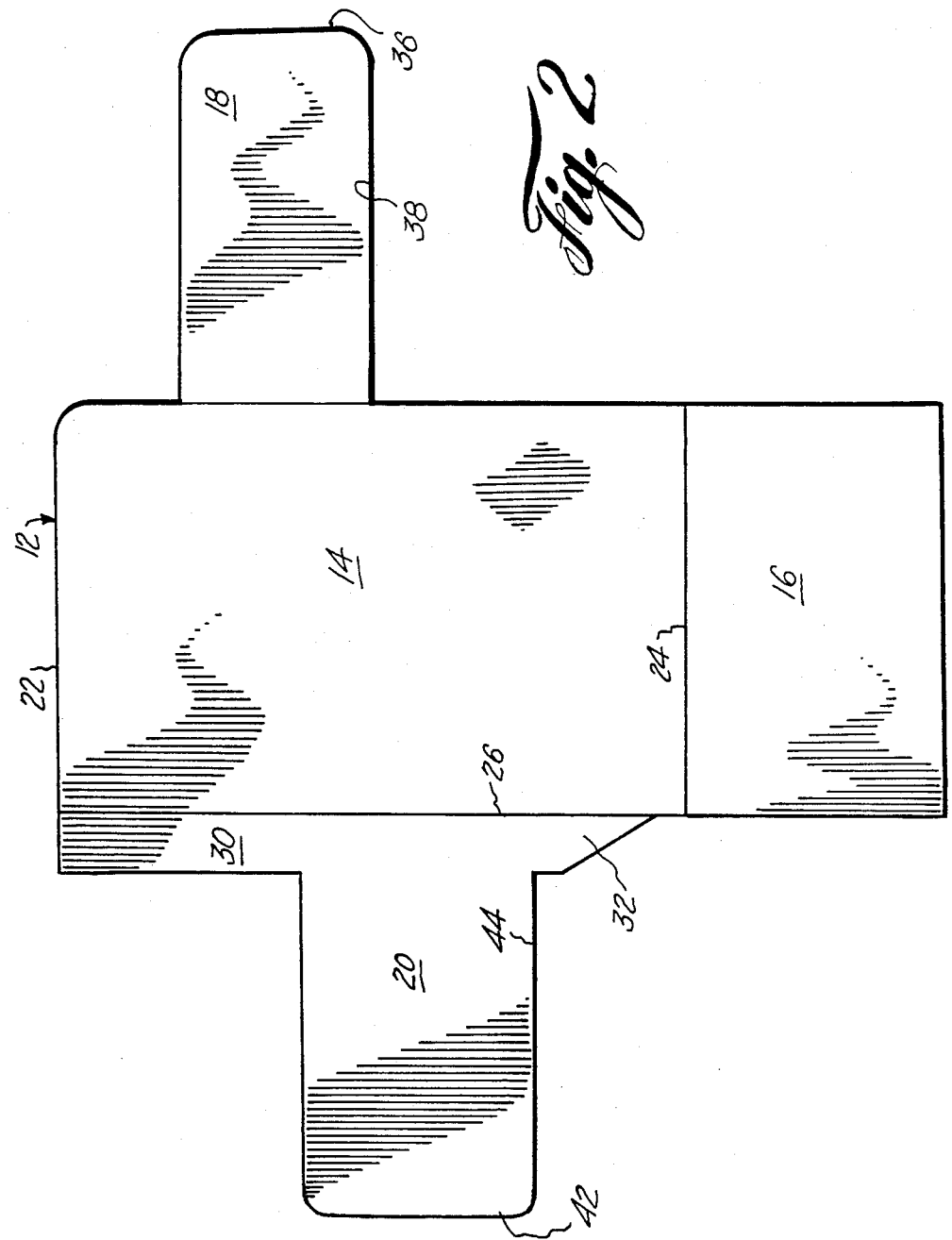

HOLDER FOR FLAT OBJECTS SUCH AS COMPUTER DISKS

BACKGROUND OF THE INVENTION

The present invention relates to multi-pocket holders for flat objects such as computer disks and the like, and also to methods for making such holders from a single sheet of foldable material.

The invention is especially suitable for use in providing multi-pocket pages which can be assembled in ring binders. The pages are especially adapted to hold and protect computer disks (also known as diskettes or floppy disks). Books of multi-pocket pages, with diskettes, are used principally to package computer programs and their instructions for sale to computer users.

The principal type of multi-pocket page on the market is made from separate sheets, usually of plastic. There is a backing sheet and several patches which are located on the backing sheet in a stair-case like stack and heat welded to provide the page.

It has been found that paper and particularly spunbonded olefin material (sold under the tradename "Tyvek") by the DuPont Company can be made into sleeves for holding individual computer disks. The olefin material can be made static free and is especially sturdy. However, the manufacture of multi-pocket pages from such material (which may have the added advantage of eliminating the need for the protective sleeves), at sufficiently low-cost to be competitive with multi-pocket pages made from heat-welded sheets and patches, is difficult. Patching operations have not been found to be cost effective because of the time required for adhesives adapted to be used with olefin materials to become tacky. Moreover, separate printing operations are required on the patches and sheets. The printed materials may have to be registered in the course of assembly of the page and held in position during bonding or setting which adds to the cost of manufacture of a multi-pocket page.

Another problem in the manufacture of the multi-pocket page from thin paper or paper like materials is in the provision for strength or reinforcement of the border of the page which is perforated to receive the rings of the ring binder.

It is also desirable to avoid the need for special machinery and fixtures for the production of multi-pocket pages from paper or paperlike material, including spunbonded olefin materials, since the cost of such equipment is a cost factor which can render the product non-competitive.

SUMMARY OF THE INVENTION

Accordingly it is the principal object of this invention to provide an improved multi-pocket holder for flat objects, such as computer disks, which can be fabricated at low cost so as to be competitive with other types of multi-pocket holders.

It is another object of the present invention to provide an improved multi-pocket page, and method of making same out of a single piece material, which can be folded and glued without the need for patches and which may be printed without separate printing operations on separate parts (e.g., separate patches) thereof.

It is a further object of the invention to provide an improved multi-pocket page through the use of spunbonded olefin, with adhesives which require time to set-up and become tacky, thus avoiding complicated and time consuming processes in the fabrication of such multi-pocket pages with patches of such olefin material.

Briefly described, a holder or multi-pocket page for flat objects, such as computer disks in accordance with the invention makes use of the single sheet of material, which may be a sheet of spunbonded olefin. The sheet is cut to provide a rectangular center panel with side, top and bottom edges, a first flap extending from one of the side edges, and a second flap extending from the bottom edge of the center panel. The first flap is secured at the center panel, as by lines of adhesive to define a first pocket open at the top thereof, with the center panel. The second flap is secured in partially overlapping relationship with the first flap at the center panel to define the second pocket below the first pocket, which partially overlaps the first pocket. In other words, the pockets are arranged in tiers or shingle-like relationship. Printing may be accomplished on the sheet prior to cutting thereof into the shape of a center panel with side and bottom flaps. A flange may be located above and even below the side flap, which folds over the center panel to strengthen a border. This border may be perforated with holes which receive the rings of a ringbinder which carries the multi-pocket page or holder. The page may be made with three pockets utilizing a side flap extending from the opposite side of the center panel and displaced upwardly from the other side flap. The other side flap is then secured in overlapping relationship with the first side flap. The adhesive may be applied immediately prior to folding, to secure the flaps and panel to each other.

The foregoing and other objects and advantages of the invention, as well as preferred embodiments and the best mode known for practicing the invention, will become more apparent from a reading of the following description in connection with the accompanying drawings in which:

BRIEF DESCRIPTION OF THE DRAWINGS

FIG. 2 is a view of the sheet layout from which the multi-pocket page show in FIG. 1 is made;

DESCRIPTION OF THE PREFERRED EMBODIMENT

Figure 1:
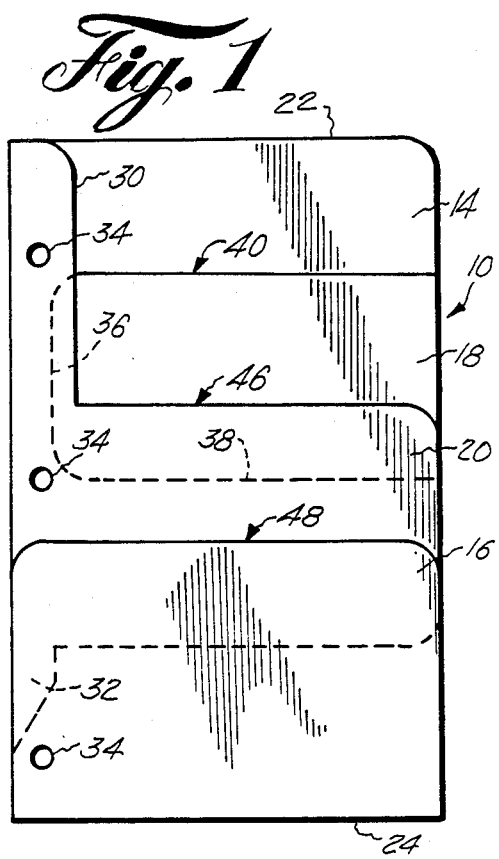
FIG. 1 is a front view of a multi-pocket page or holder in accordance with the invention.

Referring more particular to FIGS. 1 and 2, there is shown a three pocket multi-pocket page 10 for holding computer disks and other flat objects. The page 10 is made from a single sheet of foldable material, preferably spunbonded olefin. The sheet 12 is cut into the shape shown in FIG. 2. There is a center panel 14, a bottom flap 16, an upper right side flap 18 and a lower or left side flap 20. The center panel has top and bottom edges 22 and 24. It also has left and right side edges 26 and 28. The lines along the bottom edge 24 and the side edges 26 and 28, from which the flaps 16, 18 and 20 extend, are fold lines, suitably formed by scoring as will be explained in greater detail hereinafter in connection with FIG. 7.

The left side of flap 20 has, extending upwardly therefrom to the top edge 22, a flange 30. This flange can extend below the bottom edge of the left side flap 20 and is terminated with a gusset 32. The flange is sufficiently wide to form a border containing perforation holes 34 for receiving the rings of a ring binder in which the page may be mounted as one page of several of such pages in the ring binder.

The flaps 16, 18 and 20 are generally rectangular in shape. They are rounded at their free corners to facilitate handling in fabrication. The bottom flap 16 extends the full width of the center panel 14, as does the left side flap 20. The right side flap 18 may be somewhat less wide since it is overlapped by flange 30. The right and left side flaps 18 and 20 may be slightly shorter (the in the direction along the side edges 26 and 28) than the bottom flap 16. All of the flaps are sufficiently wide so that they overlap.

The right side flap 18 is folded over the center panel 14 after lines of adhesive have been applied spaced inwardly slightly from the free edge 36 thereof. A line of adhesive may be applied spaced inwardly from the bottom edge 38. These lines of adhesive can be located on the flap 18 or on the center panel 14. When overlapped and secured by the adhesive, a first pocket 40 is defined by the right side flap 18 and the center panel.

The left side flap 20 is then folded over after adhesive is applied spaced along the flange 30 the right side or free edge 42 and the bottom 44 of the left side flap 20. The left side flap 18 overlaps partially the right side flap 18 and the center panel 14. When secured with the adhesive the left side flap 20, the center panel 14 and the right side flap 18 define a second pocket 46.

The bottom flap 16 then has adhesive applied thereto in lines along the side edges 26 and 28, either in the center panel above the bottom edge 24 or in the bottom flap 16 below the bottom edge 24. The bottom flaps 16 is then folded over about the bottom edge 24 and is secured in overlapping relationship with the left side flap 20 and the center panel to define a third pocket 48. The pockets 40, 46 and 48 are in tiered, shingle-like relationship; there being three tiers, each with a separate pocket.

Figure 3:
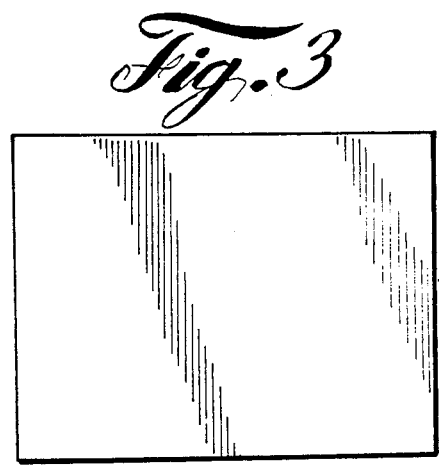
FIG. 3 thru FIG. 12 are diagrams which show steps in the method of making the multi-pocket shown in FIG. 1.
Figure 4:
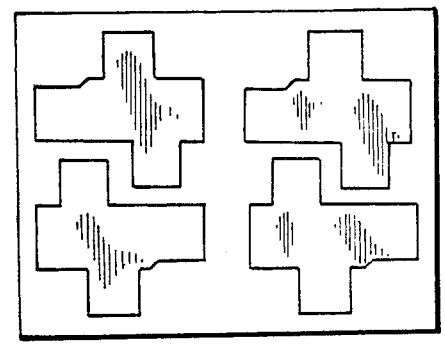

The method by which the multi-pocket page shown in FIG. 1 may be fabricated in accordance with the invention will become more apparent from FIGS. 3 through 12. The bonded olefin, as purchased under the tradename "Tyvek" from DuPont, comes in rolls where the rolls are sheeted to create a stack of sheets. Each sheet is trimmed on all four sides so that the sheets are perfectly rectangular as shown in FIG. 3.

Figure 5:
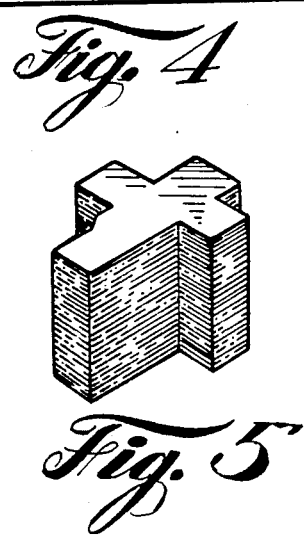

Each sheet is then printed. A lithographic printing press maybe used and the printing may be completed in one pass (or plural passes for color printing). There may be four (4) impressions on each sheet as shown diagrammatically in FIG. 4. Four blanks are cut. An envelope high die may used so that a stack of sheets is provided on each cut as shown in FIG. 5.

Figure 6:
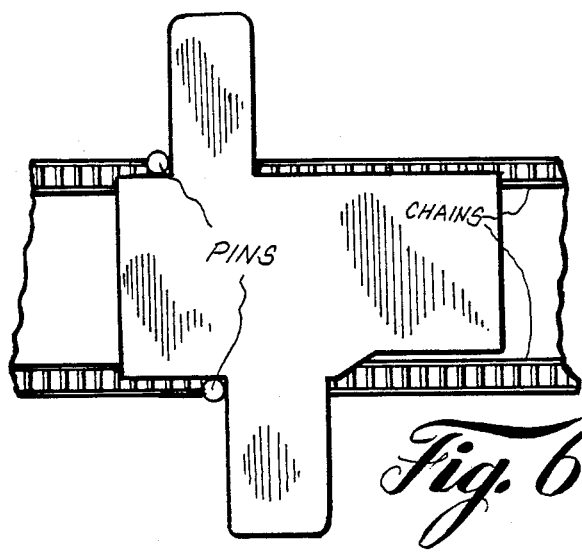
Figure 7:
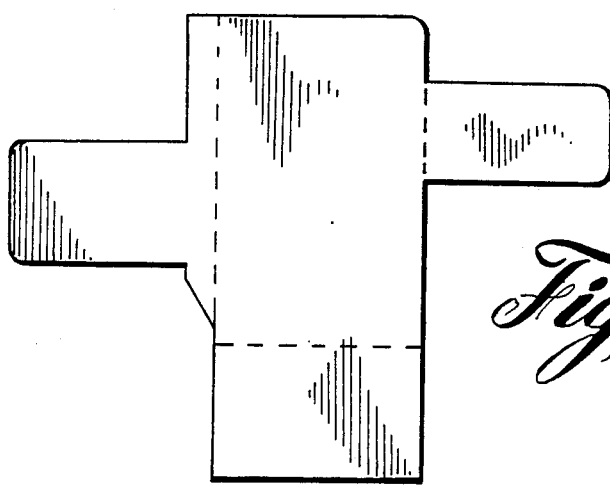
Figure 8:
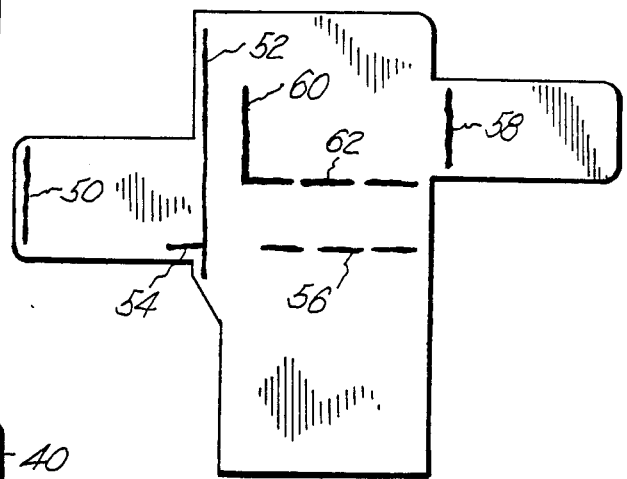

The sheets are then folded and glued to make the three pocket page 10. First, the stack shown in FIG. 5 is placed into the feed of a envelope folder with the outside of the page facing up. The individual blanks are fed from the bottom of the stack and placed on top of one another shingle style. The stack so displaced is conveyed along the folder. The blanks are pulled out of the shingle stack and refed into a set of chains having sets of pins attached to the chains as shown in FIG. 6. These chains and pins position the blank under a scoring cylinder where the fold lines, shown as dash lines in FIG. 7, are scored by the scoring cylinder.

Then adhesive to form the two top pockets 40 and 46 is printed, as by using a roller with raised areas to print lines inwardly of the edges of the center panel and flaps as shown at 50, 52, 54, 56, 58, 60, and 62. Continuous lines are not needed, as shown at 56 and 62 in FIG. 8.

Figure 9:
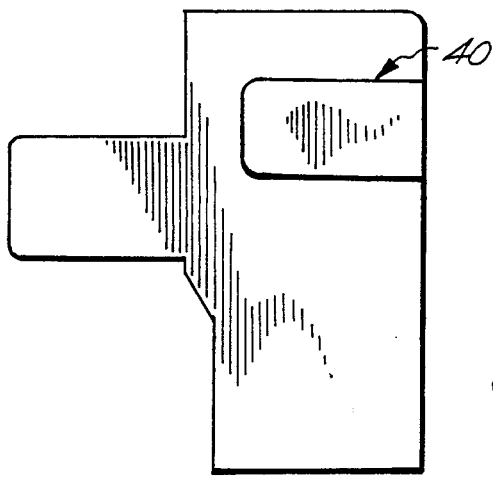
Figure 10:
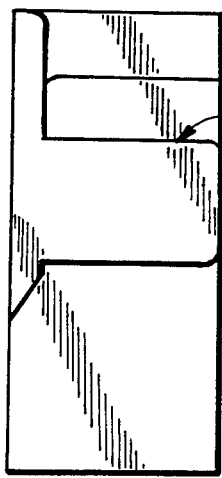
Figure 11:
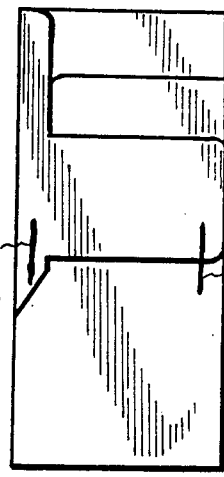
Figure 12:
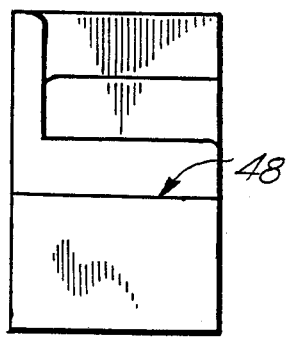

The top pocket 40 is then formed by folding the right side flap over the center panel as shown in FIG. 9. The middle pocket 46 is then formed by folding the left side flap over the center panel. Also the flange is folded to provide the edge support with increased strength for holding the page in the binder. The latter step is shown in FIG. 10. The partially completed page is then conveyed to a side seam adhesive section where to lines 64 and 66 of adhesive are printed partially over the bottom flap and center panel of the page (take 11). The bottom flap is trapped in the envelope folder and folded over the left side flap and the center panel to form the bottom pocket 48 as shown in FIG. 12.

The pages are then delivered onto a table standing up for ease of packing. A three hole punch machine may be used to make the holes 34 necessary for using the page in a ring binder. If the pages are bound into books this perforation operation is not used.

Figure 13:
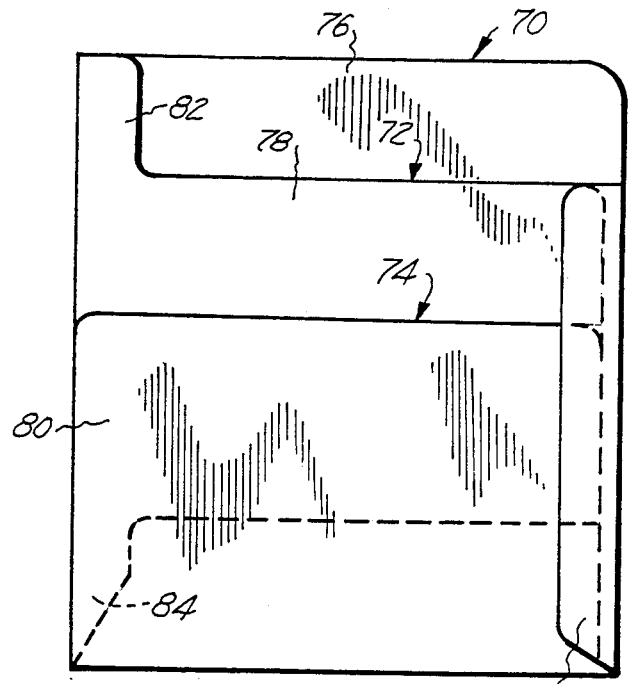
FIG. 13 is a front view of a two pocket multi-pocket page embodying the invention.

FIG. 13 shows a multi-pocket page 70 having two pockets 72 and 74. This page is formed of a single sheet of material, preferably Tyvek material, and is cut into the shape of center panel 76, a left side flap 78 and a bottom flap 80. A flange 82 and gusset 84 may extend from the side flap 78 for strengthening the edge of the page.

A right side flange 86 is used to overlap the bottom and left side flaps 80 and 78 for strengthening the right side edge or border of the page. The width of the flaps 78 and 80 may be slightly less than the width of the center panel 76, since it is overlapped by the flange 86.

The lines of adhesive are applied. Then the side flap 78 and flange 72 are folded over to define the upper pocket 72. The bottom flap is then folded over the bottom edge of the center panel after adhesive lines are applied, to define the lower pocket 74. Finally the right side flange with adhesive line applied is folded over the right side edge of the center panel and secured over the flaps 78 and 80 to complete the page. Operations similar to those described in connection with FIGS. 3 through 12 may be used to fabricate the page 70 from a single sheet of foldable material.

From the foregoing description it will be apparent that there has been provided an improved holder for flat objects such as computer disks and the like and may be used as a multi-pocket page in a ring binder. When the multi-pocket page is made from Tyvek material the computer disks may be held safely without the need for separate sleeves. Because envelope making equipment and a single printing operation is used, the cost of the multi-pocket page is competitive with other multi-pocket pages which have been offered commercially in the past. While plurality of embodiments have been described as well as the preferred method of making a multi-pocket page, variations and modifications thereof within the scope of the invention will undoubtedly suggest themselves skilled in the art. Accordingly the foregoing description should be taken as illustrative and not in a limiting sense.

We claim:

1. A holder for flat objects, such as computer disks in tiered relationship, which comprises a single sheet of material having a rectangular center panel with side, top and bottom edges, a first flap extending from one of the side edges and a second flap extending from the bottom edge, said first flap being disposed above said bottom edge of said center panel, said first flap being secured to the center panel to define a first pocket open at the top thereof with said center panel, said first pocket being spaced from said bottom edge, and said second flap being secured in partially overlapping relationship with said first flap to said center panel to define a second pocket below said first pocket and in partially overlapping, tiered relationship with said first pocket.

2. A holder for flat objects, such as computer disks, which comprises a single sheet of material having a rectangular center panel with side, top and bottom edges, a first flap extending from one of the side edges and a second flap extending from the bottom edge, said first flap being secured to the center panel to define a first pocket open at the top thereof with said center panel, and said second flap being secured in partially overlapping relationship with said first flap at said center panel to define a pocket below said first pocket and in partially overlapping, tiered relationship with said first pocket, a flange extending above said first flap along said one side edge of said center panel towards the top edge of said center panel, and said flange being secured to said center panel when said first pocket is defined.

3. The holder according claim 2 wherein said flange also extends below said first flap towards the bottom edge of said center panel.

4. The holder according to claim 3 wherein at least a portion of said flange which extends below said first flap is a gusset.

5. The holder according to claim 3 wherein said first and second flaps have widths approximately equal to the width of said center panel between the side edges thereof.

6. The holder according to claim 5 wherein said flange has a width much shorter than the width of side flap and provides a strengthened area along the side edge, said area having perforations for mounting said holder in a ring binder as a page therein.

7. A holder for flat objects, such as computer disks, which comprises a single sheet of material having a rectangular center panel with side, top and bottom edges, a first flap extending from one of the side edges and a second flap extending from the bottom edge, said first flap being secured to the center panel to define a first pocket open at the top thereof with said center panel, and said second flap being secured in partially overlapping relationship with said first flap at said center panel to define a pocket below said first pocket and in partially overlapping, tiered relationship with said first pocket, a flange extending above said first flap along said one side edge of said center panel towards the top edge of said center panel, said flange being secured to said center panel when said first pocket is defined, said flange also extending below said first flap towards the bottom edge of said center panel, another flange extending along the side edge of said center panel opposite from said one side edge, said other flange extending substantially from the bottom edge of said center panel a distance of about equal to the distance between the top edge of said first flap and said bottom edge of said center panel, said other flange being secured in overlapping relationship with said first flap and said second flap.

8. The holder according to claim 1 wherein said sheet consists of spunbonded olefin.

9. The holder according to claim 1 wherein lines of adhesive are disposed between said flaps and said center panel and between said flaps where they are in overlapping relationship, said lines being spaced inwardly of the edges of said flaps which are unattached to said center panel to define a border between said pockets and said one side edge of said center panel.

10. A multi-pocket holder for flat objects such as computer disks which provides at least three pockets in tiered relationship without the need for separate pocket forming patches, said holder comprising a single sheet of foldable material, said sheet having a rectangular center panel which defines at least in part the back of each of said pockets, said center panel having opposite side edges, a top edge and a bottom edge, first, second and third flaps, said flaps being generally rectangular and having top, bottom and side edges, said first flap extending from one of said side edges of said center panel, said second flap extending form the other of said side edges of said second panel, said first and second flaps being displaced from each other in the direction along said side edges of said center panel with top edge of said second flap, the bottom edge of said second flap being displaced upwardly from the bottom edge of said center panel, said third flap extending from the bottom edge of said center panel with the bottom edge of said third flap displaced from the bottom edge of said center panel a distance greater that the distance from the bottom edge of said center panel of the bottom edge of said second flap, said first flap being disposed in overlapping relationship with said center panel and being secured to said center panel to define the first pocket along the top edge of said first flap, said second flap being disposed in overlapping relationship with said first flap and said center panel to define a second pocket partially below said first pocket, and said third flap being disposed in overlapping relationship with said second flap and said center panel to define the third pocket partially below said second pocket, said pockets being stacked in tiered, shingle-like relationship.

11. The multi-pocket holder according to claim 10 further comprising a flange extending from the top edge of said second flap toward the top edge of said center panel along said one side edge of said center panel, said flange being of width less than the width of said flaps sufficient to form a border for receiving perforations along said one side edge of said center panel, said flange being secured in overlapping relationship with said first flap and said center panel.

12. The multi-pocket holder according to claim 11 further comprising a gusset extending from the lower edge of said second flap along said one side edge of said center panel and being secured in overlapping relationship with said center panel.

13. The multi-pocket page according to claim 10 further comprising a plurality of lines of adhesive between said center panel and said flaps and between said flaps, said lines being inwardly from the side edges of said flaps for securing said flaps and said panel to each other in permanently fixed relationship with said pockets open to form the tops thereof, and to form a border between at least one of the side edges of said center panel and said pockets.

14. The multi-pocket holder according to claim 11 wherein the width of said first flap is less than the width of said center flap and said flange overlaps said first flap along the side edge thereof which is spaced from said other side edge of said center panel.

15. The multi-pocket holder according to claim 14 wherein the widths of said second and third flaps are about equal to the width of center panel.

16. The multi-pocket holder according to claim 10 wherein said sheet consists of spunbonded olefin.

* * * * *